United States Patent
Tanaka et al.

[11] Patent Number: 6,105,250
[45] Date of Patent: Aug. 22, 2000

[54] METHOD OF PRODUCING HYDRODYNAMIC TYPE POROUS OIL-IMPREGNATED BEARING

[75] Inventors: Toshihiko Tanaka, Aichi-ken; Isao Komori, Kuwana, both of Japan

[73] Assignee: NTN Corporation, Osaka, Japan

[21] Appl. No.: 09/115,682

[22] Filed: Jul. 15, 1998

[30] Foreign Application Priority Data

Jul. 18, 1997 [JP] Japan .................................. 9-194304

[51] Int. Cl.$^7$ ...................................................... B23P 15/00
[52] U.S. Cl. ............................................................ 29/898.02
[58] Field of Search ............................... 29/898.02, 898, 29/898.049, 898.045, 898.057; 384/279, 129, 100

[56] References Cited

U.S. PATENT DOCUMENTS

| | | | |
|---|---|---|---|
| 4,847,962 | 7/1989 | Puetz | 29/898.02 |
| 5,519,933 | 5/1996 | Sakashita et al. | 29/598 |
| 5,645,355 | 7/1997 | Tokushima et al. | 384/133 |

*Primary Examiner*—David P. Bryant
*Assistant Examiner*—Marc W. Butler
*Attorney, Agent, or Firm*—Arent, Fox, Kintner, Plotkin & Kahn

[57] ABSTRACT

The inner peripheral surface of the larger-outer-diameter portion 11a is pressed against the upper forming portion 20 of the sizing core rod 12, so that the bearing surface of a shape corresponding to the forming portion 20 is formed in the inner peripheral surface. As the upper punch 14a and the sizing core rod 12 are further moved in operative association with each other, the end of the smaller-outer-diameter portion 11b reaches the tapered portion 21b1 of the drawing portion 21b, so that it is subjected to a radially inwardly directed pressurizing force. Thereby, the inner peripheral surface of the smaller-outer-diameter portion 11b is pressed against the lower forming portion 20 of the sizing core rod 12, so that the bearing surface of a shape corresponding to the forming portion 20 is formed in the inner peripheral surface.

7 Claims, 4 Drawing Sheets

METHOD OF PRODUCING HYDRODYNAMIC TYPE POROUS OIL-IMPREGNATED BEARING

BACKGROUND OF THE INVENTION

The present invention relates to a method of producing a hydrodynamic pressure type porous oil-impregnated bearing which is suitable for use as a bearing for small-sized motors required to have high rotational accuracy and a low torque characterstic, such as drive motors for CD-ROM, DVD-ROM, DVD-RAM, laser beam printers, hard disks, floppy disks. Zips and the like or for axial flow fan motors.

In small-sized spindle motors associated with information-handling devices, the possibility of replacing rolling bearings by sintered oil-impregnated bearings is being investigated for the purpose of cost reduction. However, since a porous oil-impregnated bearing is a kind of circular bearing, it tends to produce unstable vibrations where the shaft eccentricity is small, having the drawback of being liable to induce the so-called whirl in which the shaft is subjected to a revolving vibration at a rate which is half the rotary speed. Countermeasures therefore include the provision of hydrodynamic pressure generating grooves, such as the herringbone or spiral type, in the bearing surface. In such hydrodynamic pressure type bearings, the rotation of the shaft produces hydrodynamic pressure in the bearing clearance to support the shaft, exhibiting a high effect of suppressing shaft vibration.

In this connection, generally the porous oil-impregnated bearings are singly used. Besides this, however, there is known an arrangement wherein a shaft is supported at two places by press-fitting two porous oil-impregnated bearings into a bearing holder. With this arrangement, the bearing surface of each of the bearings can be reduced and the accuracy of each of the bearings is improved the more, the smaller the width; therefore, the arrangement is effective for uses where low torque is required or where a temperature rise should be avoided.

However, since it is difficult to secure axial alignment between two bearings, the bearing clearance has to be inevitably increased (leading to a decrease in rotation accuracy). And when hydrodynamic pressure generating grooves are formed in the bearing surface, during insert into a housing, the respective directions of the hydrodynamic pressure generating grooves of two bearings have to be made to coincide with each other, at which time there arise problems including one that it is difficult to check the direction of the hydrodynamic pressure generating grooves (since the hydrodynamic pressure generating grooves are formed in the inner peripheral surface of the bearing).

One solution to this problem is to form bearing surfaces at opposite end portions of a bearing and increase the inner diameter between the bearing surfaces to form a relief surface, methods of production thereof being known from, e.g., from Japanese Patent Publication Kokoku Showa 63-43611 and Japanese Patent Publication Kokai Heisei 2-8302.

With said two methods of production, however, it is impossible to form hydrodynamic pressure generating grooves in a bearing surfaces and hence the problems including shaft vibration cannot be solved.

Further, with the method disclosed in Japanese Patent Publication Kokoku Showa 63-43611, it is necessary to form an annular groove in an outer peripheral surface of the axially middle region of a sintered body, requiring the use of a special forming press machine or plastic processing, leading to cost increase. On the other hand, with the method disclosed in Japanese Patent Publication Kokai Heisei 2-8302, an inner peripheral surface of a powder compact is formed with a larger-outer-diameter portion and a smaller-outer-diameter portion and during the sizing operation the larger and smaller-outer-diameter portions differ in the amount of correction (the distance traveled until such portions reach a sizing core rod), so that the inner diameter and pores are liable to vary in distribution.

SUMMARY OF THE INVENTION

Accordingly, an object of the present invention is to provide a method of producing at low cost and with high precision a hydrodynamic pressure type porous oil-impregnated bearing comprising bearing surfaces which are formed in the opposite end regions of a bearing body and which have hydrodynamic pressure generating grooves formed therein, and a relief surface between the bearing surfaces whose inner diameter is larger than that of the bearing surfaces.

To achieve said object, the present invention provides the method comprising the steps of;

forming a cylindrical porous material having at one end a larger-outer-diameter portion and at the other end a smaller-outer-diameter portion whose outer diameter is smaller than that of the larger-outer-diameter portion, forming an outer peripheral surface of a core rod with a pair of axially spaced forming portions for forming bearing surfaces having axially inclined hydrodynamic pressure generating grooves, placing the core rod in an inner peripheral portion of the porous material such that an inner peripheral surface of the larger-outer-diameter portion and an inner peripheral surface of the smaller-outer-diameter portion are opposed to the forming portions of the core rod, respectively, whereupon with this state maintained, the porous material is pressed into a forming hole having a cylindrical portion smaller in diameter than the larger-outer-diameter portion and a drawing portion decreased in diameter to be smaller than the smaller-outer-diameter portion, radially inwardly pressurizing the larger-outer-diameter portion of the porous material by the cylindrical portion of the forming hole and the smaller-outer-diameter portion of the porous material by the drawing portion of the forming hole, respectively, so as to press the inner peripheral surfaces of the larger and smaller-outer-diameter portions against the forming portions of the core rod, thereby forming the respective inner peripheral surfaces with said bearing surfaces having shapes corresponding to the forming portions.

In this process, after forming the bearing surfaces, the core rod can be released from the inner peripheral portion of the porous material while utilizing the spring-back of the porous material due to extraction of the porous material from the forming hole.

In addition, rotational sizing may be applied to the inner peripheral portion of the porous material after forming the porous material before press-fitting the porous material into the forming hole.

Further, the porous material may be formed of a sintered metal which contains, for example, copper or iron, or both as a main component.

According to the present invention, a porous oil-impregnated bearing, which has bearing surfaces provided with hydrodynamic pressure generating grooves at the opposite end portions and the region between said bearing surfaces being increased in diameter to form a relief, can be efficiently produced without substantially changing the conventional process for producing porous oil-impregnated bearings. At this time, there is no need for press working or plastic working a required in the conventional method so that the cost is low, and since such bearing can be produced from a powder compact whose inner peripheral surface is straight, the accuracy of the bearing surface and the occurrence of variations in the distribution of the pores can be prevented.

After the bearing surfaces have been formed, if the core rod is removed from the inner peripheral portion of the porous material by utilizing the spring-back of the porous material due to extraction of the porous material from the forming hole, crumbling of the hydrodynamic pressure generating grooves due to interference with the forming portion of the core rod can be prevented without adding a special mechanism.

After the compaction of the porous material and before it is pressed into the forming hole, if rotational sizing is applied to the inner peripheral potion of the porous material, the distribution of the pores in the inner peripheral surface of the porous material can be easily controlled.

DESCRIPTION OF THE PREFERRED EMBODIMENTS

An embodiment of the present invention will now be described with reference to FIGS. 1 through 7.

A hydrodynamic pressure type porous oil-impregnated bearing according to the invention is provided through various steps such as forming, sintering, sizing (forming), cleaning, impregnation with lubrication oil or lubricating grease, and inspection.

Figure 1:
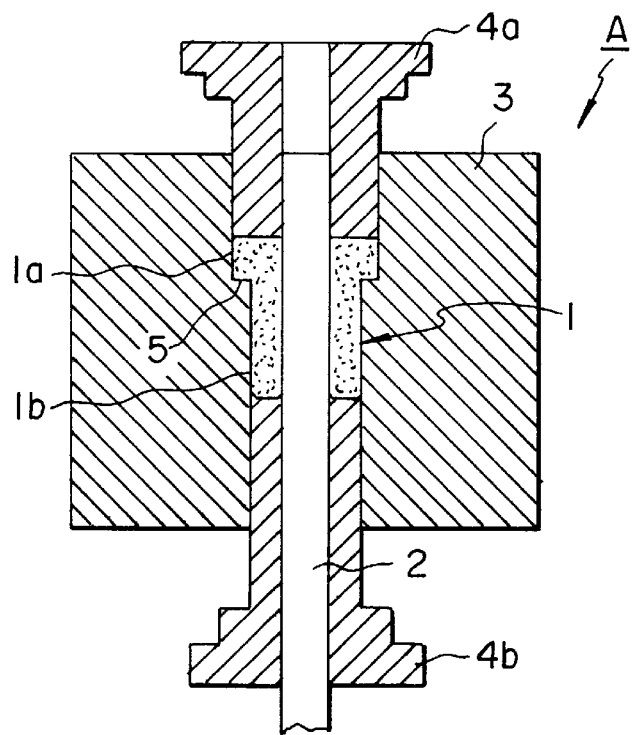
FIG. 1 is a longitudinal sectional view of the powder forming device used in the present invention method.

Forming is performed by using a forming device A shown in FIG. 1. As shown, this device A comprises a core 2 for forming the inner surface of a powder compact 1, a die 3 for forming the outer peripheral surface of the powder compact 1, and upper and lower punches 4a, 4b for pressing a material powder from axially opposite sides to determine the axial dimension of the powder compact 1 (in the vertical direction as seen in the drawing). The core rod 2 has an outer diameter such that the inner diameter of the powder compact 1 is slightly larger than the outer diameter of a sizing core rod 12 to be later described. The inner peripheral surface of the die 3 is formed with a step 5 for forming the powder compact 1 with a larger-outer-diameter portion 1a and a smaller-outer-diameter portion 1b.

Figure 2:
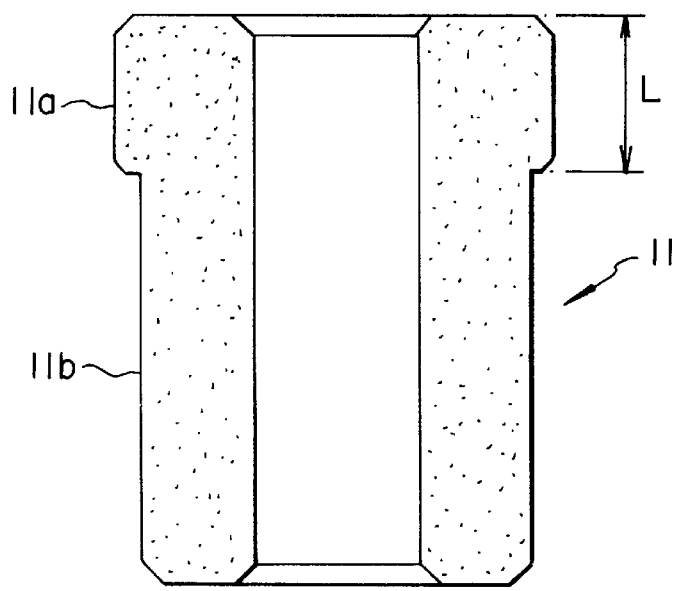
FIG. 2 is a longitudinal sectional view of a powder compact.

Forming by the use of this device A is effected by charging a material powder into the die 3 with the core 2 inserted in the latter and relatively moving the upper and lower punches 4a, 4b toward each other to pressurize the material powder. The powder compact 1 thus obtained is substantially cylindrical as shown in FIG. 2, having at one end a larger-outer-diameter portion 1a with a larger outer diameter, the other portion being a smaller-outer-diameter portion 1b whose outer diameter is smaller than that of larger-outer-diameter portion 1a. At this time, the axial width L of the larger-outer-diameter portion 1a is considerably short as compared with the axial width of the smaller-outer-diameter portion 1b (specifically, it is slightly larger than the axial width of a bearing surface 25a to be later described).

Sintering this powder compact 1 provides a porous sintered material 11 (hereinafter referred to as a "porous material"). The porous material 11 can be formed of powder metallurgical material, cast iron, a synthetic resin or ceramic material by sintering or foam-molding or the like.

Figure 3:
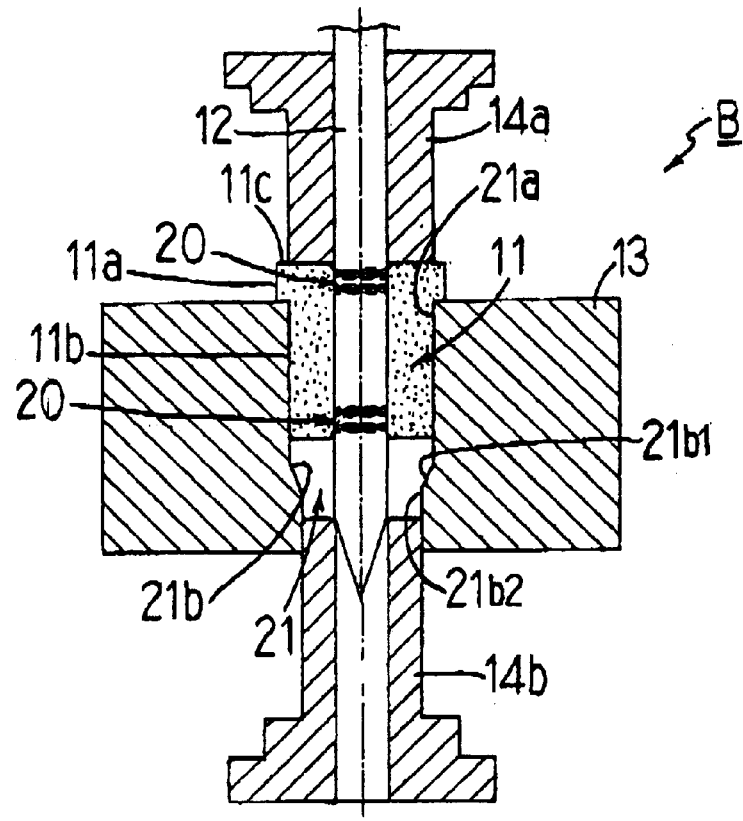
FIG. 3 is a longitudinal sectional view of a sizing device.

The sizing (forming) step is performed by a sizing device B shown in FIG. 3. This device B comprises a core rod, e.g., a sizing core rod 12 for sizing operation, to be inserted into the inner peripheral portion of the porous material 11, a die 13 for forming the outer peripheral surface of the porous material 11, and upper and lower punches 14a, 14b for pressing the porous material 11 from the axially opposite sides to determine the axial width thereof.

Figure 4:
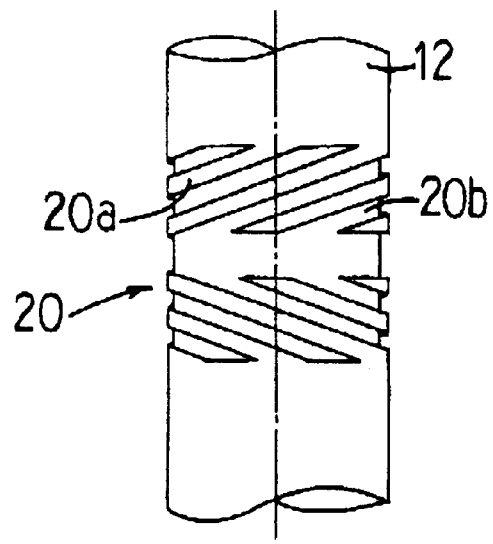
FIG. 4 is an enlarged front view of a forming portion formed in a sizing core rod.

The sizing core rod 12 is formed at two places on its outer peripheral surface with axially spaced forming portions 20 for forming bearing surfaces so as to correspond to the larger and smaller-outer-diameter portions 1a and 1b (or so as to coincide with the positions of the larger and smaller-outer-diameter portions). Such forming portion 20, as shown in FIG. 4, comprises raised areas 20a which define hydrodynamic pressure generating grooves in the bearing surface, and recessed areas 20b which define ridges between the hydrodynamic pressure generating grooves. The raised areas 20a are formed to correspond to the hydrodynamic pressure generating groove pattern on the bearing surface, and in the drawing, an example which correspond to the so-called herringbone type hydrodynamic pressure generating grooves is shown. The shape of the hydrodynamic pressure generating grooves is optional so long as they are axially inclined. When inclined grooves of other type, e.g., spiral type, are desired, the raised areas 20a will be formed into a shape corresponding to the shape of the grooves in question.

The outer diameter of the sizing core rod 12 is slightly smaller than the inner diameter of the porous material 11 so that a minute clearance is defined between the sizing core rod 12 and the porous material 11 disposed on its outer peripheral surface.

A forming hole 21 formed in the die 13 comprises a cylindrical portion 21a formed in the inlet side, and a drawing portion 21b formed in the innermost side. The cylindrical portion 21a formed such that it is as large as or slightly larger than the outer diameter of the smaller-outer-diameter portion 11b of the porous material 11 to ensure smooth insertion of the smaller-outer-diameter portion 11b therein and such that it smaller than the outer diameter of the larger-outer-diameter portion 11a by a predetermined amount. The drawing portion 21b comprises a tapered portion 21b1 whose inner diameter is gradually decreased, and a cylindrical straight portion 21b2 disposed in the innermost side, the inner diameter of the straight portion 21b2 being smaller than the outer diameter of the smaller-outer-diameter portion 11b of the porous material 11.

The sizing by the use of this device B is effected in the following process. Firstly, as shown in FIG. 3, the smallerouter-diameter portion 11b of the porous material 11 is inserted into the cylindrical portion 21a of the die 13 and the sizing core rod 12 is inserted into the inner peripheral portion of the porous material 11, and the upper surface 11c of the porous material 11 is pressed against the lower surface of the upper punch 14a. Thereby, the positioning of the porous material 11 with respect to the sizing core rod 12 is effected, so that of the porous material 11, the inner peripheral surface of the larger-outer-diameter portion 11a and the inner peripheral surface of the lower end portion of the smaller-outer-diameter portion 11b are respectively opposed to the associated forming portions 20 of the sizing core rod 12. In this state, the upper punch 14a and the sizing core rod 12 are lowered in operative association with each other, whereby the larger-outer-diameter portion 11a of the porous material 11 is press-fitted in the cylindrical portion 21a, and the resulting pressurizing force directed radially inward causes the material of the large-outer-diameter portion 11a to flow to the inner diameter size. In addition, the difference in level between the larger and smaller-outer-diameter portions 11a and 11b is very small, being some micrometers, so that there is no danger of the larger-outer-diameter portion 11a crumbling when inserted into the cylindrical portion 21a.

As the press fitting proceeds, the inner peripheral surface of the larger-outer-diameter portion 11a is displaced radially inward and pressed by the upper forming portion 20 of the sizing core rod 12, so that hydrodynamic pressure generating groove 23 of a shape corresponding to the raised portions 20a on the forming portion 20 are formed in the inner peripheral surface. Simultaneously, ridges 24 between the hydrodynamic pressure generating grooves 23 are formed by the recessed areas 20b of the forming portion 20.

Figure 5:
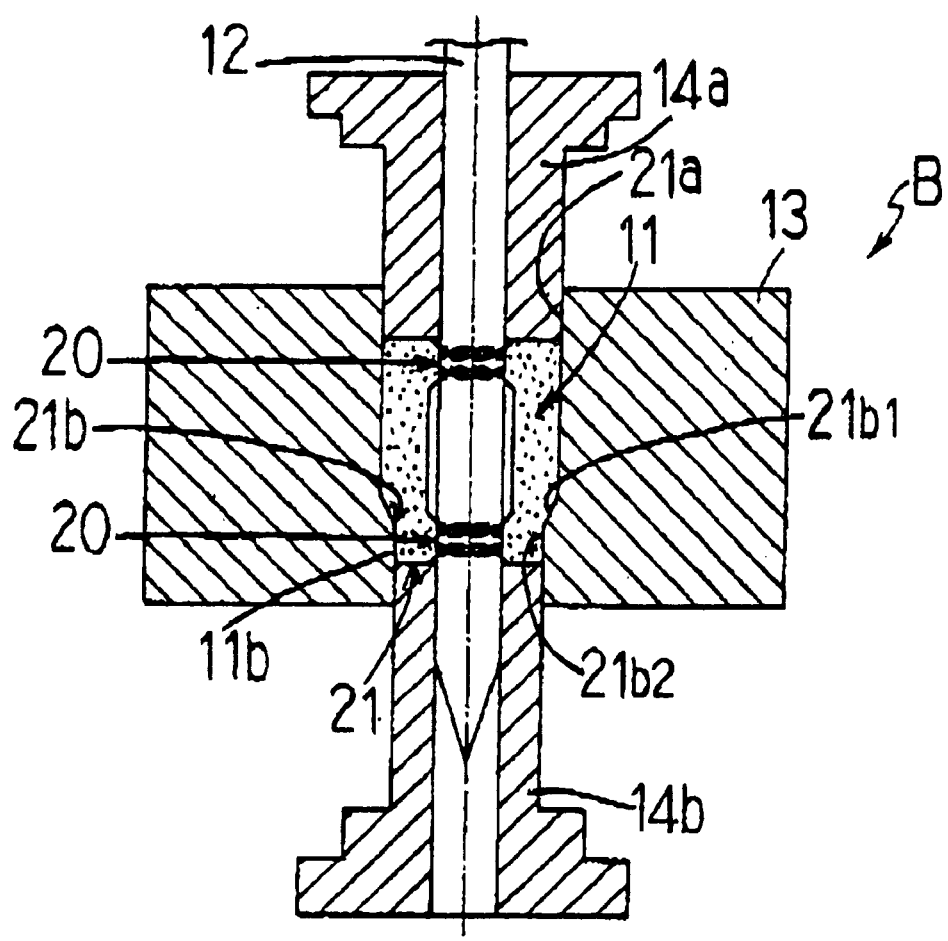
FIG. 5 is a longitudinal sectional view showing the state after completion of sizing.

As the upper punch 14a and the sizing core rod 12 are further moved in operative association with each other, as shown in FIG. 5, the end of the smaller-outer-diameter portion 11b reaches the tapered portion 21b1 of the drawing portion 21b, so that it is subjected to a radially inwardly directed pressurizing force. Thereby, the material of the end of the smaller-outer diameter portion 11b flows radially inward and the inner peripheral surface thereof is pressed against the lower forming portion 20 of the sizing core rod 12. And predetermined hydrodynamic pressure generating grooves 23 are formed by the raised areas 20a of the forming portions 20 and the ridges 24 are formed by the recessed areas 20b. Further, the end of the smaller-outer-diameter portion 11b is radially inwardly drawn and hence the outer peripheral surface thereof is reduced in diameter.

Thereafter, the upper and lower punches 14a and 14b and the sizing core rod 12 are lifted in operative association with each other to lift the compacted porous material 11 until the latter is extracted from the die 13. At the same time as the porous material 11 is extracted from the die 13, it springs back such that its inner peripheral surface is slightly increased in diameter. Thereafter, even when the porous material 11 is extracted from the sizing core rod 12, there is no danger of the hydrodynamic pressure generating grooves 23 interfering with the raised areas 30a of the forming portion 20 to result in crumbling.

The extraction of the porous material 11 from the sizing core rod 12 has been described above as being effected by utilizing the spring-back of the porous material 11; besides this, it may be effected by inserting a expansively and contractibly fabricated sizing core rod 12 into the inner peripheral portion of the porous material 11, increasing the diameter of the sizing core rod 12 to impart a pressurizing force to the porous material 11 to thereby form hydrodynamic pressure generating grooves therein, and then reducing the diameter of the sizing core rod 12 by a suitable method.

Figure 6:
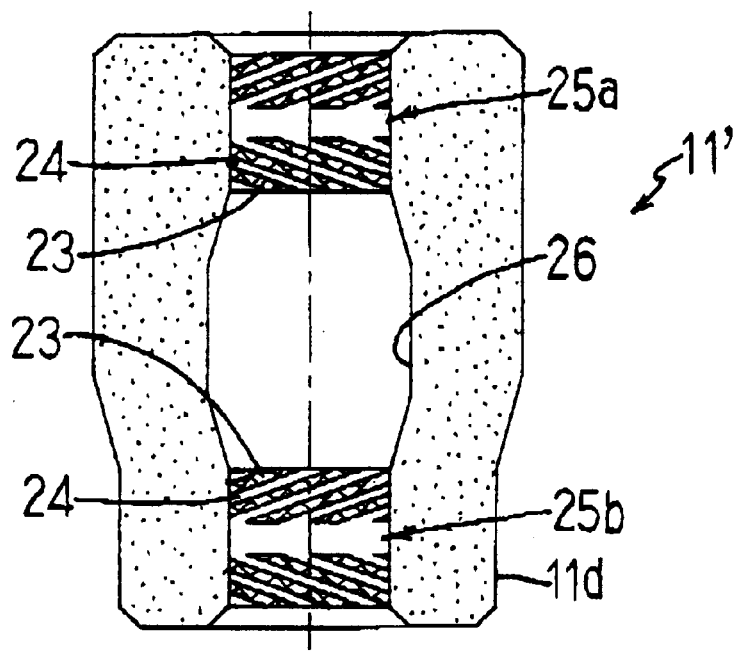
FIG. 6 is a longitudinal sectional view of a porous oil-impregnated bearing produced by the present inventive method.

The porous material 11 thus obtained is cleaned and then impregnated with lubricating oil or lubricating grease, thus providing a porous oil-impregnated bearing 11' shown in FIG. 6. The inner peripheral surface of this porous oil-impregnated bearing 11' has been formed at its opposite ends with bearing surfaces 25a and 25b projecting radially inward and having hydrodynamic pressure generating grooves 23 and with a relief portion 26 disposed in the region between the bearing surfaces 25a and 25b and having an inner diameter larger than the bearing surfaces 25a and 25b. The cross-sectional shape of the relief portion 26 is not limited so long as the relief portion is not in contact with the shaft; it may comprise a straight line as shown in FIG. 6, a curve or a combination of a straight line and a curve.

This porous oil-impregnated bearing 11' is small in the areas of the bearing surfaces 25a and 25b and high in the accuracy of the bearing surfaces 25a and 25b, so that as compared with a single bearing whose bearing surface extends over the entire axial length of the bearing, it is superior in low torque characteristic and produces a reduced temperature rise. Further, since sizing is effected by the use of a single sizing core rod 12, the axial alignment between the two bearing surface 25a and 25b is satisfactory. Unlike the case of press-fitting two bearings into the inner periphery of a housing, there is no need to check the direction of the hydrodynamic pressure generating grooves and the assembling operation never becomes troublesome. Further, since the bearing surfaces 25a and 25b are formed with hydrodynamic pressure generating grooves 23, a high effect of suppression of shaft vibration is observed. Further, since the larger and smaller-outer-diameter portions 1a and 1b are formed on the outer peripheral surface of the powder compact 1, directional alignment during sizing can be easily attained.

As compared with the conventional method, in forming the powder compact 1, since there is no need for special forming press working or plastic working as required in Japanese Patent Publication Kokoku Showa 63-43611, low-cost processing can be attained. Further, since the inner peripheral surface of the powder compact 1 is a cylindrical surface which is straight, an advantage is obtained that there is least possibility of incurring a variation in dimensional accuracy or in the distribution of the poreos of the bearing surface 25a and 25b due to a localized amount of correction as in Japanese Patent Publication Kokai Heisei 2-8302.

Figure 7:
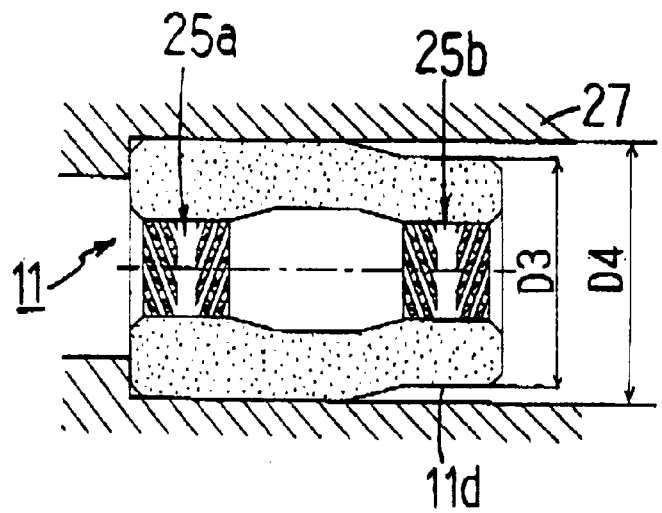
FIG. 7 is a longitudinal sectional view of the porous oil-impregnated bearing press-fitted in a housing.

Further, since one end of the porous oil-impregnated bearing is drawn to have a reduced diameter, as described above, also when this bearing is press-fitted and fixed in the inner periphery of a housing 27 in the manner shown in FIG. 7, it is possible to prevent or mitigate deformation under the press-fitting force on one bearing surface 25b formed in the inner peripheral surface of the drawn portion 11d, and hence high accuracy can be easily attained. The dimensional difference (D4-D3) dimensional difference prior to press-fitting) between the outer peripheral surface of the drawn portion 11d and the outer peripheral surface of the other portion is detrmined by considering the interference of press-fit between the bearing and the housing 27 in such manner as to result either in noncontact of the outer peripheral surface of the drawn portion 11d with the inner periphery of the housing 27 or in an amount of interference which does not influence the bearing accuracy.

Since the porous oil-impregnated bearing is of the construction which circulates oil between the bearing clearance and the interior of the bearing, if the distribution of the pores which serve as inlets and outlets for oil in the entire inner peripheral surface of the bearing is nonuniform, this brings harmful effects, such as said oil circulation being partly prevented. Therefore, the distribution of pores should desirably be made uniform throughout the inner peripheral surface.

For this purpose, it is effective to apply rotational sizing to the entire area of the inner peripheral surface of the porous material 11 in advance prior to forming the hydrodynamic pressure generating grooves. More specifically, after the forming of the porous material 11 and before the formation of bearing surfaces, for example, a shaft-like rod which has no recess on ridge such as the forming portion (ad which has, e.g., a square cross section is inserted into the porous material 11, whereupon it is rotated so that its outer peripheral surface "sizes" the inner peripheral surface of the porous material. Thereafter, the core rod is extracted, and then bearing surfaces are likewise formed by the sizing core rod 12 having the forming portions 20.

In addition, the sizing core rod 12 used in this embodiment is circular in cross section; however, its cross sectional shape is optional so long as the shape is uniform throughout the axial length.

What is claimed is:

1. A method of producing a hydrodynamic pressure type porous bearing, comprising the steps of;

forming a cylindrical porous material having at one end a larger-outer-diameter portion and at the other end a smaller-outer-diameter portion whose outer diameter is smaller than that of the larger-outer-diameter portion, forming an outer peripheral surface of a core rod with a pair of axially spaced forming portions for forming bearing surfaces having axially inclined hydrodynamic pressure generating grooves, placing the core rod in an inner peripheral portion of the porous material such that an inner peripheral surface of the larger-outer-diameter portion and an inner peripheral surface of the smaller-outer-diameter portion are opposed to the forming portions of the core rod, respectively, whereupon with this state maintained, the porous material is pressed into a forming hole having a cylindrical portion smaller in diameter than the larger-outer-diameter portion and a drawing portion decreased in diameter to be smaller than the smaller-outer-diameter portion, radially inwardly pressurizing the larger-outer-diameter portion of the porous material by the cylindrical portion of the forming hole and the smaller-outer-diameter portion of the porous material by the drawing portion of the forming hole, respectively, so as to press the inner peripheral surfaces of the larger and smaller-outer-diameter portions against the forming portions of the core rod, thereby forming the respective inner peripheral surfaces with said bearing surfaces having shapes corresponding to the forming portions.

2. A method of producing a hydrodynamic pressure type porous bearing as set forth in claim 1, wherein after forming the bearing surfaces, the core rod is released from the inner peripheral portion of the porous material while utilizing the spring-back of the porous material due to extraction of the porous material from the forming hole.

3. A method of producing a hydrodynamic pressure type porous bearing as set forth in claim 1 or 2, wherein rotational sizing is applied to the inner peripheral portion of the porous material after forming the porous material before press-fitting the porous material into the forming hole.

4. A method of producing a hydrodynamic pressure type porous bearing as set forth in claim 1 or 2, wherein the porous material is formed of a sintered metal.

5. A method of producing a hydrodynamic pressure type porous bearing as set forth in claim 4, wherein the sintered metal contains, one of copper, iron, and a combination of copper and iron as a main component.

6. A method of producing a hydrodynamic pressure type porous bearing as set forth in claim 3, wherein the porous material is formed of a sintered metal.

7. A method of producing a hydrodynamic pressure type porous bearing as set forth in claim 6, wherein the sintered metal contains, one of copper, iron and a combination of copper and iron as a main component.

* * * * *